US012704977B2

(12) United States Patent
Benisty

(10) Patent No.: US 12,704,977 B2
(45) Date of Patent: Aug. 11, 2026

(54) EFFECTIVE KEY MANAGEMENT FOR DATA ENCRYPTION AND DECRYPTION

(71) Applicant: SANDISK TECHNOLOGIES, INC., Milpitas, CA (US)

(72) Inventor: Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 482 days.

(21) Appl. No.: 17/950,593

(22) Filed: Sep. 22, 2022

(65) Prior Publication Data

US 2023/0019584 A1 Jan. 19, 2023

Related U.S. Application Data

(63) Continuation-in-part of application No. 16/890,973, filed on Jun. 2, 2020, now Pat. No. 11,641,276.

(51) Int. Cl.
*G06F 3/06* (2006.01)

(52) U.S. Cl.
CPC ............ *G06F 3/062* (2013.01); *G06F 3/0659* (2013.01); *G06F 3/0673* (2013.01)

(58) Field of Classification Search
CPC ...... G06F 3/062; G06F 3/0659; G06F 3/0673; G06F 3/0613; G06F 3/0614; G06F 3/0644; G06F 3/0656; G06F 3/0679
See application file for complete search history.

(56) References Cited

U.S. PATENT DOCUMENTS 5,948,081 A * 9/1999 Foster ................. G06F 13/1642 710/39
7,984,208 B2 * 7/2011 Gustafson ............. G06F 13/385 710/36
8,250,376 B2 8/2012 Osaki
9,258,111 B2 2/2016 Lee et al.
9,665,501 B1 * 5/2017 Obukhov ............ G06F 12/1408
9,679,165 B2 6/2017 Pittelko
9,769,131 B1 * 9/2017 Hartley ............... H04W 12/033
2008/0260159 A1 10/2008 Osaki
2015/0310221 A1 10/2015 Lietz et al.
2021/0367777 A1 11/2021 Benisty et al.
2021/0377017 A1 12/2021 Benisty et al.
2022/0029793 A1 1/2022 Kachare et al.

FOREIGN PATENT DOCUMENTS

CN 113420308 A * 9/2021

* cited by examiner

*Primary Examiner* — Arpan P. Savla
(74) *Attorney, Agent, or Firm* — Patterson + Sheridan, LLP

(57) ABSTRACT

Modifying support security parameters without stalling data transfer rather than stalling the data transfer when support security modification requests are received is an effective key management operation for data encryption and decryption. For example, incorporating multiple security partition slots in the device controller. Each slot holds security parameters and an IO counter that holds the current number of pending commands in the device that are going to use that slot. The security partition slots are used as ping-pong buffers allowing the device to modify a second slot while freezing the values on a first slot until completing the previous queued commands that are still under execution. The slots allow support security parameter on-the-fly modifications without stalling any IO traffic. The slots feature is very important for QoS and system performance.

17 Claims, 12 Drawing Sheets

EFFECTIVE KEY MANAGEMENT FOR DATA ENCRYPTION AND DECRYPTION

CROSS-REFERENCE TO RELATED APPLICATION

This application is a continuation-in-part of U.S. patent application Ser. No. 16/890,973, filed Jun. 2, 2020. The aforementioned related patent application is herein incorporated by reference in its entirety

BACKGROUND OF THE DISCLOSURE

Field of the Disclosure

Embodiments of the present disclosure generally relate to modifying support security parameters without stalling data transfer.

Description of the Related Art

A solid-state drive (SSD) stores logical blocks of data on non-volatile media (NVM) (e.g., NAND). SSDs are required to be secured to protect user information. The standard security algorithm is the XTS encryption and decryption. The security requirements state that everything the host device writes to the NAND should be encrypted on the NAND and decrypted back when the host device reads the information. Some examples for security related parameters are the following. Security keys used by AES-XTS engine for user data encryption and decryption. Access permission for read and write operations which could be per namespace and PCIe port. Command and feature lockdown used to prohibit the execution of commands submitted to NVM Express controllers and/or management endpoints in an NVM subsystem. Index to security key table. Security range table is used to map the host namespace ID and LBA to key index. In key-per-io drive, the table is bypassed since the table is directly provided by the Host.

When receiving a request to modify security related parameters, the data storage device stops fetching new commands and waits until completing all pending commands. Only after squeezing the entire system, the security database is updated, which is a valid solution in client applications. In enterprise the approach is not valid due to the strict quality of service (QoS) requirements. Complex firmware (FW) flows that keep track of all outstanding IOs and determine the correct timing for changing the security parameters is also challenging. The flows are very complex and time consuming, which may also influence the performance and QoS.

Therefore, there is a need in the art for modifying support security parameters without stalling data transfer.

SUMMARY OF THE DISCLOSURE

The present disclosure generally relates to modifying support security parameters without stalling data transfer. Rather than stalling the data transfer when support security modification requests are received. The disclosure proposes incorporating multiple security partition slots in the device controller. Each slot holds security parameters and an IO counter that holds the current number of pending commands in the device that are going to use that slot. The security partition slots are used as ping-pong buffers allowing the device to modify a second slot while freezing the values on a first slot until completing the previous queued commands that are still under execution. The slots allow support security parameter on-the-fly modifications without stalling any IO traffic. Th slots feature is very important for QoS and system performance.

In one embodiment, a data storage device comprises: a memory device; and a controller coupled to the memory device, wherein the controller is configured to: receive a command; determine that the command utilizes security attributes; attach current security partition identification (ID) to the command; increment an input-output (IO) security counter; obtain security related attributes from current security partition; and execute the command.

In another embodiment, a data storage device comprises: a memory device; and a controller coupled to the memory device, wherein the controller is configured to: receive a security attribute change request; allocate a security partition slot, wherein the controller comprises at least two partition slots and wherein each partition slot has different security attributes; initialize the allocated security partition slot; and enable command fetching.

In another embodiment, a data storage device comprises: memory means; and a controller coupled to the memory means, wherein the controller comprises a first security partition slot and a second security partition slot, and the controller is configured to: process first commands with attributes associated with the first security partition slot; receive a security attribute change request; and process second commands with attributes associated with the second security partition slot, wherein at least one first command is executed after receiving the security attribute change request, wherein the at least one first command is executed with the attributes associated with the first security partition slot, and wherein execution of the first commands does not stop upon receipt of the security attribute change request.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to modifying support security parameters without stalling data transfer. Rather than stalling the data transfer when support security modification requests are received. The disclosure proposes incorporating multiple security partition slots in the device controller. Each slot holds security parameters and an IO counter that holds the current number of pending commands in the device that are going to use that slot. The security partition slots are used as ping-pong buffers allowing the device to modify a second slot while freezing the values on a first slot until completing the previous queued commands that are still under execution. The slots allow support security parameter on-the-fly modifications without stalling any IO traffic. The slots feature is very important for QoS and system performance.

The disclosure herein results in incorporating multiple security partition slots in the device controller. Each slot holds security parameters and an IO counter that holds the current number of pending commands in the device. The security partition slots allow the device to modify that other slot while freezing the values on the first slot till completing the previous queued commands that are still under execution.

Figure 1:
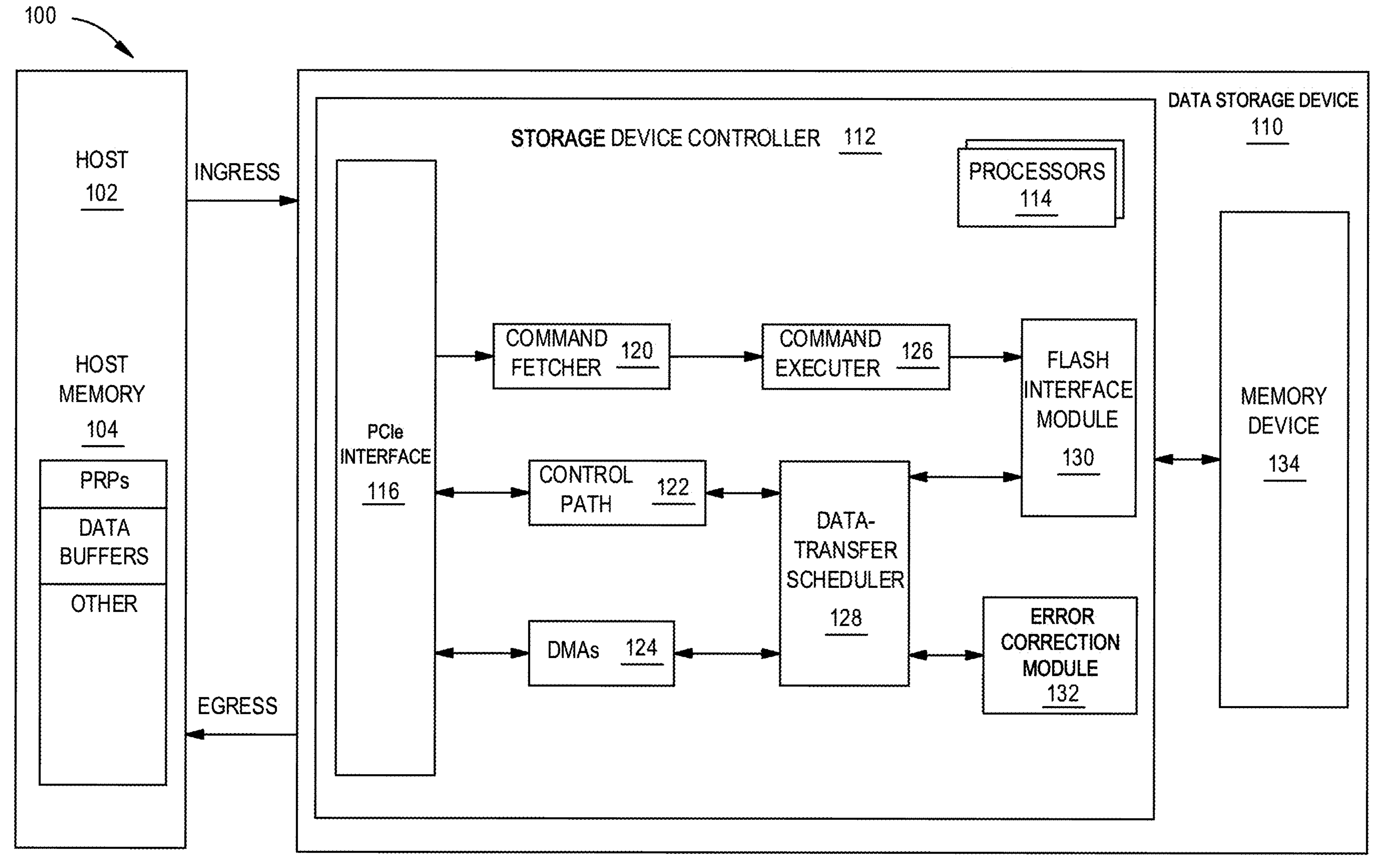
FIG. 1 is a schematic block diagram illustrating a storage system according to one embodiment.

FIG. 1 is a schematic block diagram illustrating a storage system 100 according to one embodiment. The host 102 may utilize a memory device 134, such as a non-volatile memory (NVM), included in data storage device 110 to store and retrieve data effectively. Host 102 comprises a host memory 104 and an interface (not shown). Host 102 may include a wide range of devices, such as computer servers, network attached storage (NAS) units, desktop computers, notebook (e.g., laptops) computers, tablet computers (e.g., "smart" pads), mobile devices, set-top boxes, telephone handsets (e.g., "smart" phones), televisions, cameras, display devices, digital media players, video gaming consoles, video streaming devices, automotive applications (e.g., mapping, autonomous driving), or other devices capable of running one or more virtualized hosts. In certain embodiments, host 102 includes any device having a processing unit or any form of hardware capable of processing data, including a general purpose processing unit, dedicated hardware (such as an application specific integrated circuit (ASIC)), configurable hardware such as a field programmable gate array (FPGA), or any other form of processing unit configured by software instructions, microcode, or firmware. Host memory 104 is a device allowing information, such as executable instructions, cryptographic keys, configurations, and other data, to be stored and retrieved. Host memory 104 can be DRAM, virtual memory, other main memories, and combinations thereof. The host memory 104 comprises parallel redundancy protocols, data buffers, and other components.

The interface can be a network interface or a data storage device interface. Network interface enables host 102 to communicate with data storage device 110 via a communication medium. Network interface may be one or more network adapters, also referred to as Network Interface Cards (NICs). Data storage device interface enables host 102 to communicate with data storage device 110 via a dedicated link.

The host 102 interface interacts with a data storage device 110 interface for ingress and egress of communications between host 102 and data storage device 110. Data storage device 110 interface and host 102 interface operate under a communication protocol, such as a Peripheral Component Interface Express (PCIe) serial communication protocol or other suitable communication protocols. The interface includes one or more ports, such as a PCIe port, an RDMA port (Ethernet, RoCE/iWARP, InfiniBand), a fibre channel port, a TCP port, or other suitable fabric ports. Devices connected to the PCIe fabric direct communications to other devices by providing a PCIe address. The fabric routes such communications to the appropriate device based on the PCIe address. One portion of the address is a device number that specifies the physical device to which a communication is to be routed.

Host 102 and data storage device 110 can communicate over the PCIe interface through NVMe communications. NVMe communications can be by one or more of NVMe over PCIe fabrics, NVMe over non-PCIe fabrics, and/or local PCIe. NVMe over non-PCIe fabrics includes a transport abstraction layers at both sides of the fabric interfaces to translate native PCIe transactions over non-PCIe fabrics. Host 102 can be connected to the data storage device 110 over a data center storage system network, an enterprise storage system network, a storage area network, a cloud storage network, a local area network (LAN), a wide area network (WAN), the Internet, other networks, wired links, wireless links, and interconnections thereof.

Data storage device 110 may be a network storage device, an internal storage drive (e.g., server computer, desktop hard drive, notebook computer), a data center storage device, an external storage device, an embedded mass storage device, a removable mass storage device, and other suitable data storage devices.

Data storage device 110 includes a storage device controller 112 which manages operations of data storage device 110, such as writes to and reads from a zoned namespace of a NVM 134 comprising ZNS protocol. The term NVM used herein may refer to the NS-A individually or to the one or more non-volatile memory units within the data storage device 110 for exemplary purposes. Each namespace comprises one or more zones, such as Zone 0 and Zone 1. Storage device controller 112 may include one or more processors 114, which may be multi-core processors. Processor 114 handles the components of data storage device 110 through firmware and/or software. Processor 114 executes instructions of the computer-readable program code of the firmware and/or software. Storage device controller 112 implements the processes described herein by execution of instructions by the processor 114, by hardware, or by combinations thereof. Hardware can include various components of storage device controller 112, such as logic gates, switches, application specific integrated circuits (ASICs), programmable logic controllers, embedded microcontrollers, registers, and other components.

Storage device controller 112 may operate under the NVMe protocol, but other protocols are applicable. The NVMe protocol is a communications interface/protocol developed for SSDs to operate over a host and storage device linked over a PCIe interface 116. NVMe protocol provides a command queue and completion path for access of data stored in data storage device 110 by host 102.

The NVM 134 of data storage device 110 may be configured for long-term storage of information as non-volatile memory space and retains information after power on/off cycles. NVM 134 may consist of one of more dies of NAND flash memory. Other examples of non-volatile memory include phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in data storage device 110. Each platter may contain one or more regions of one or more tracks of data. NVM 134 may include one or more types of non-volatile memory.

Data storage device 110 may also include other components, such as a flash interface module 130, an error correction module 132, a command fetcher 120, a command executor 126, and a control path 122. The storage device controller 112 may utilize the flash interface module 130 to interact with NVM 134 for read and write operations. DMA module 124 executes data transfers between host 102 and data storage device 110 without involvement from a host 102 CPU. Data transfer scheduler 128 controls the data transfer while activating the control path for fetching physical page regions (PRPs), posting completion and interrupts, and activating the DMAs for the actual data transfer between host 102 and data storage device 110. Error correction module 132 corrects the data fetched from the memory arrays. Command fetcher 120 parses commands to command executor 126 for execution on flash interface module 130.

Figure 2:
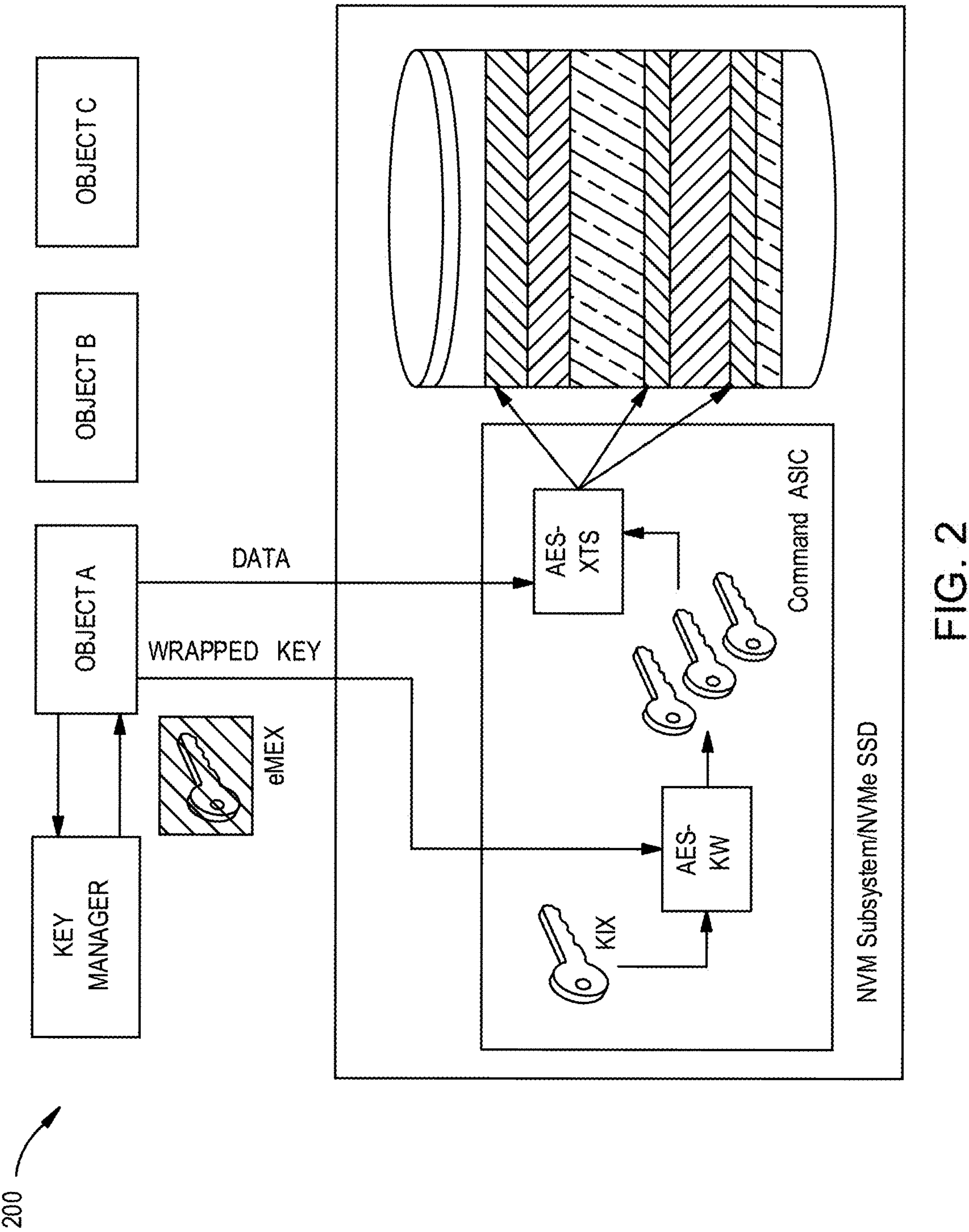
FIG. 2 is a schematic illustration of KPIO according to one embodiment.

FIG. 2 is a schematic illustration of a Key Per I/O (KPIO) 200. according to one embodiment. As noted above, for each command or namespace, the host can specify a key for encrypting and decrypting. The host determines which key is applicable to which command or namespace. As shown in FIG. 2, the host device has a key manager and several objects labeled Object A-Object C. Objects A-C represent either different commands or different namespaces, dependent upon the desired scheme noted above. The host provides the key to the data storage device separate from the data. The keys are stored in the data storage device separate from the data. The encrypted data is stored in the memory device of the data storage device. The encrypted data includes an indication of the specific key for encrypting and decrypting.

The host can load more keys, remove keys, and update keys as desired. Removing keys is important especially when the key database is full. The NVMe standard defines that key management is done by admin commands (a different thread than the IO commands), whereas key selection is done directly in the command.

The keys are used by the data storage device to encrypt and decrypt any IO command sent by the host. The AES-XTS is on the device side on the media controller ASIC. The AES-XTS is the encryption and decryption algorithm. FIG. 2 gives an example using Object A. Object A includes an indication of the key. The data storage device takes the data and, based upon the key, encrypts the data and write the data to memory. Object B and Object C will operate as Object A in the example given above.

Figure 3A:
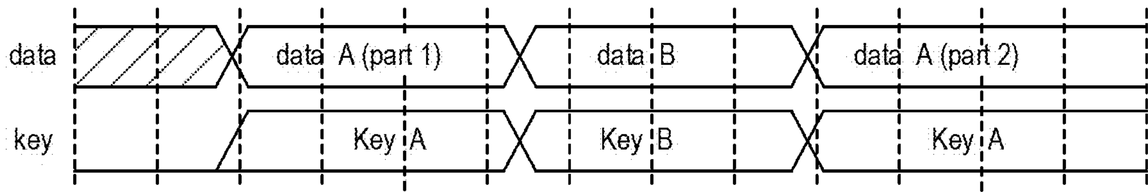
FIGS. 3A-3C are schematic illustrations of data-key behavior according to various embodiments.
Figure 3B:
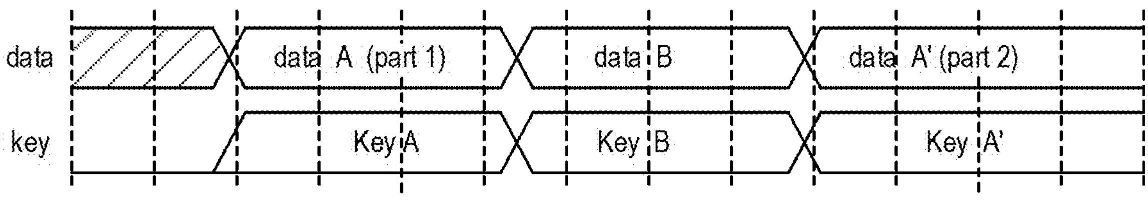
Figure 3C:
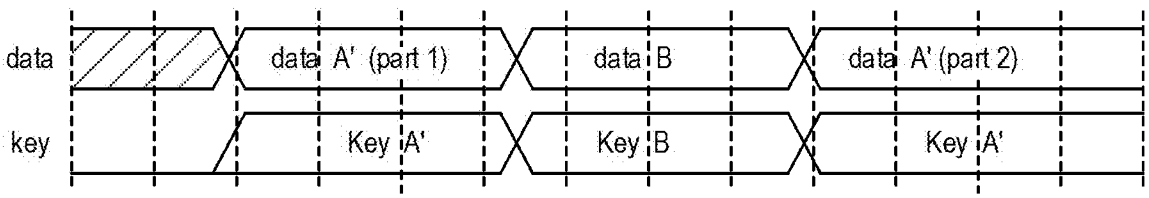

FIGS. 3A-3C are schematic illustrations of data-key behavior according to various embodiments. FIG. 3A demonstrates, through an example, how keys are used throughout the service of an IO read command. The same example can be used for an IO write. In FIG. 3A, part 1 of data A is serviced with Key A, followed by data B serviced with Key B, then part 2 of data A with Key A again. The data is properly decrypted for both data A and data B because the key properly matches the data.

FIGS. 3B and 3C show two problems that can occur due to key switching. FIG. 3B shows an example where the key is changed in the middle of a command. As shown in FIG. 3B the data for command A comes out garbled, as the data is partially decrypted by Key A, and partially by Key A'. As a result, the host receives incorrect data. FIG. 3C shows an example where the key is changed prior to completing the command. As shown in FIG. 3C the data for command A comes out garbled, as data A' is decrypted by the incorrect key, Key A' rather than Key A. As a result, the host receives wrong data.

Figure 4:
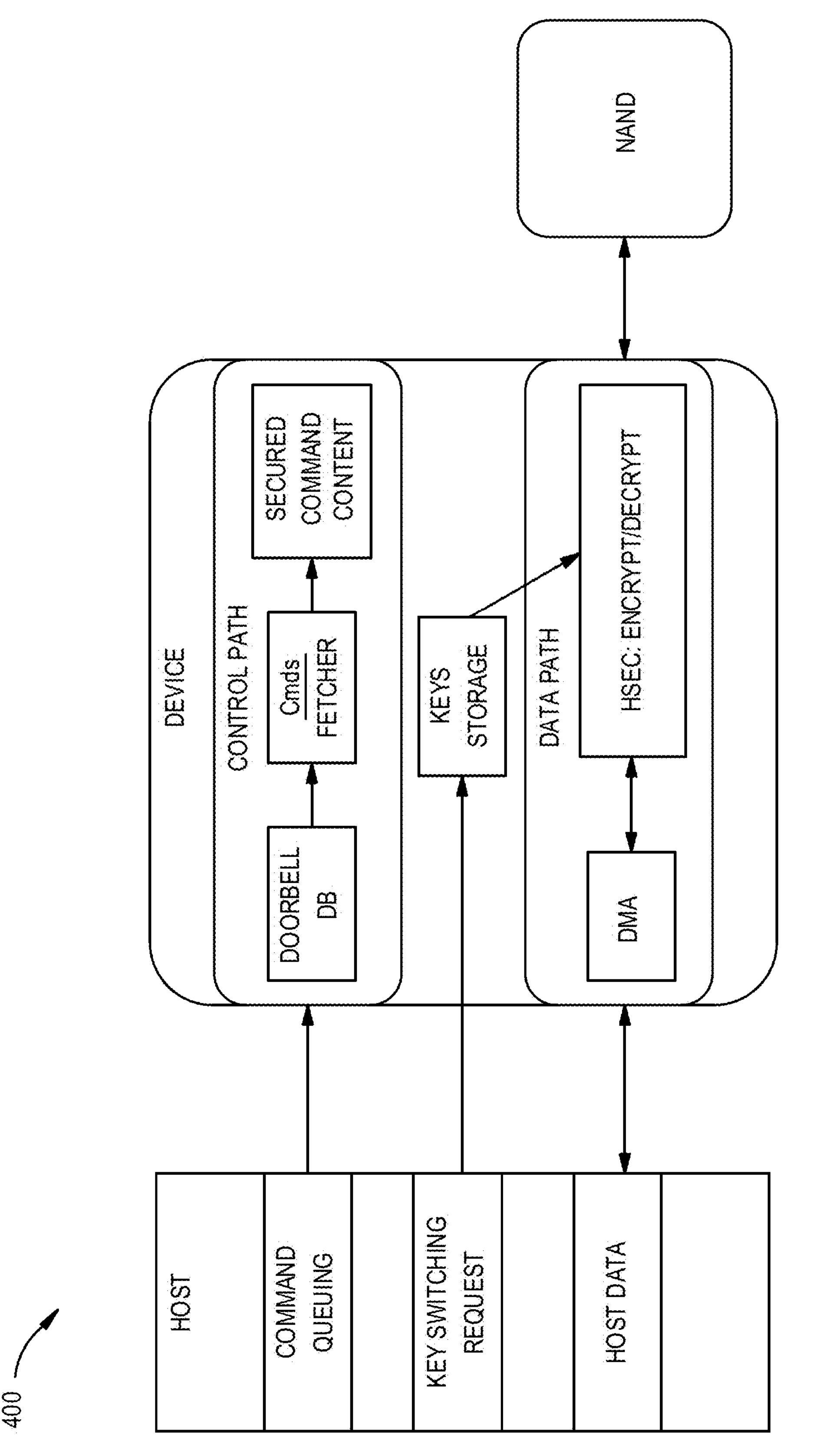
FIG. 4 is a schematic illustration of key management.

FIG. 4 is a schematic illustration of a key management 400. As shown in FIG. 4, the host device is responsible for switching the keys in the correct timing, which adds extra complexity in the host side by having synchronization between the administrative and input/output paths. There are two main drawbacks in the approach illustrated in FIG. 4, complexity and performance degradation. As shown in FIG. 4 (by the arrow from keys storage to data path), the key is taken directly from storage when the key is required for the encryption/decryption process. There are two straightforward solutions that could be implemented in the device, but both approaches have disadvantages in performance.

The first solution is to stop fetching new commands and do not start servicing already-fetched new commands. Finish servicing all pending commands, then change the key, and then enable both fetching and servicing new commands. Performance is greatly impacted due to stopping of all the data flow pipes.

The second solution is to stop servicing new commands that require the use of the key index whose key is about to be switched. Finish all commands using that key index that already started, and only then do the key switch. A counter of "how many commands per key index" is required for this implementation. Once the counter is 0, the key switch can take place, and new commands directed to that key index can occur. The performance is impacted as some commands are not serviced to allow the counter to reach 0.

Figure 5:
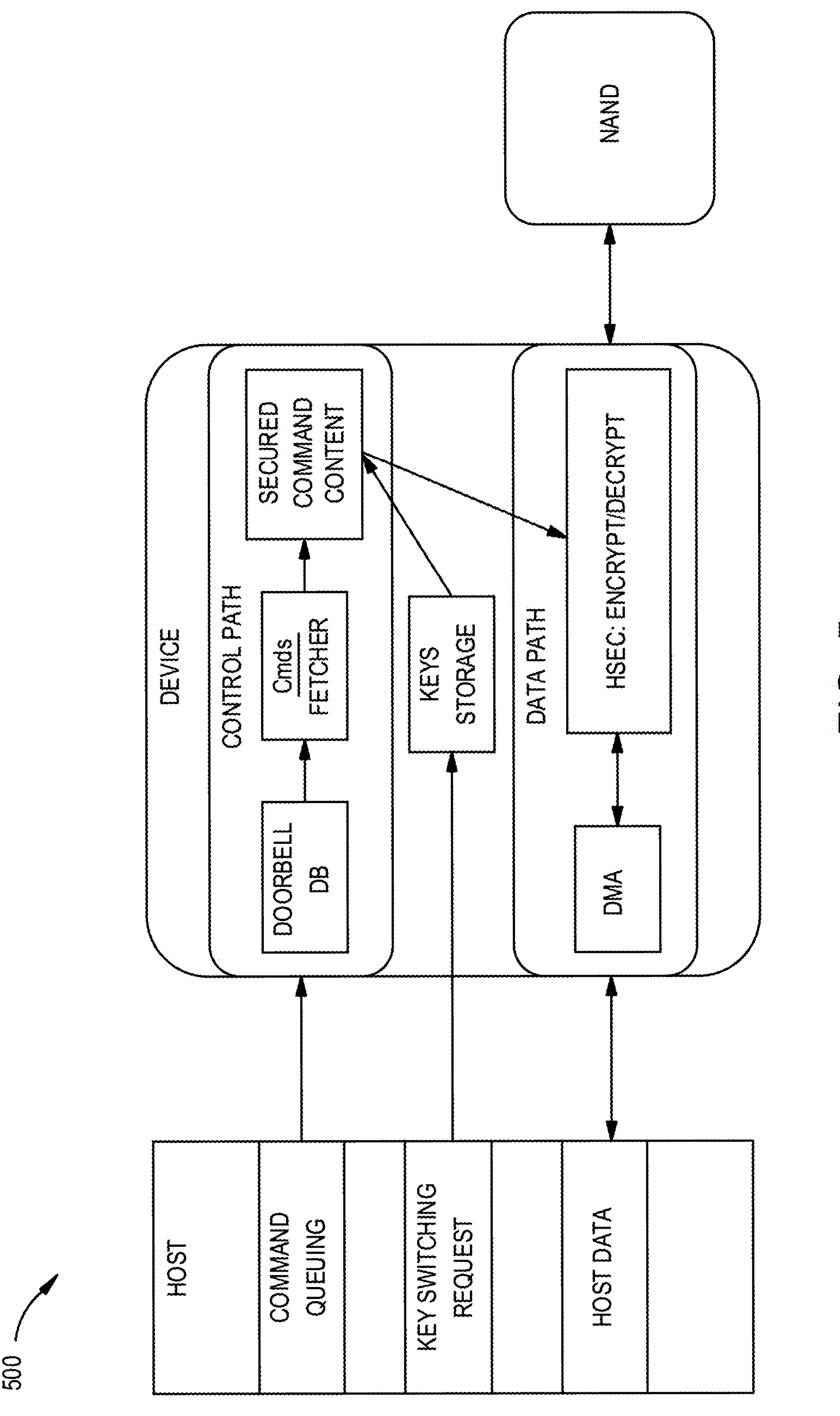
FIG. 5 is a schematic illustration of key management according to one embodiment.

FIG. 5 is a schematic illustration of a key management 500 according to one embodiment. As shown in FIG. 5, matching the actual key, instead of just a key index, to the command upon fetching form host is shown. Matching the actual key will ensure that each command is using the correct key throughout the entire lifespan of the command, even if the key is switched before the command is serviced. To avoid a racing condition, the key switching should take place when all previously queued input/output commands have been mapped to use the original queue.

In operation 1008, if the command from the host device does use any security attributes then the device controller attaches the current security partition ID to the command. In operation 1010, after the security partition ID is attached to the command the device controller then increments the relevant IO counter. In operation 1012, the device controller takes the security related attributes from the relevant security partition ID.

A completion flowchart is shown in operations 1014-1020. When completing a command, the relevant IO counter may be decremented. In operation 1014, there is a completion posting request. In operation 1016, the device controller determines whether the command uses any security attributes. If the command does not use any security attributes then the process will proceed to operation 1020. In operation 1018, if the command does use any security attributes then the device controller decrements the relevant IO counter. In operation 1020, the data storage device proceeds to post the completion entry to the host device.

As shown in FIG. 5, the host command queuing informs the device about the existence of new commands through a doorbell (DB) mechanism. The DB is the mapping of all commands queued by the host. The command fetcher is responsible for fetching a command and extracting the relevant key index. The command fetcher will update the secured command-context with the actual key, and not the key index. The secured command context holds the key used by the command. The key storage is used as the source for copying keys to secured-command-context, and gives the admin flow a way to handle the keys. In the data path, for read commands the host security module security engine (HSEC) receives the data from the NAND, uses the key from secured-command-context, and passes decrypted data to the DMA towards the host. The opposite direction is valid for write commands.

Figure 6:
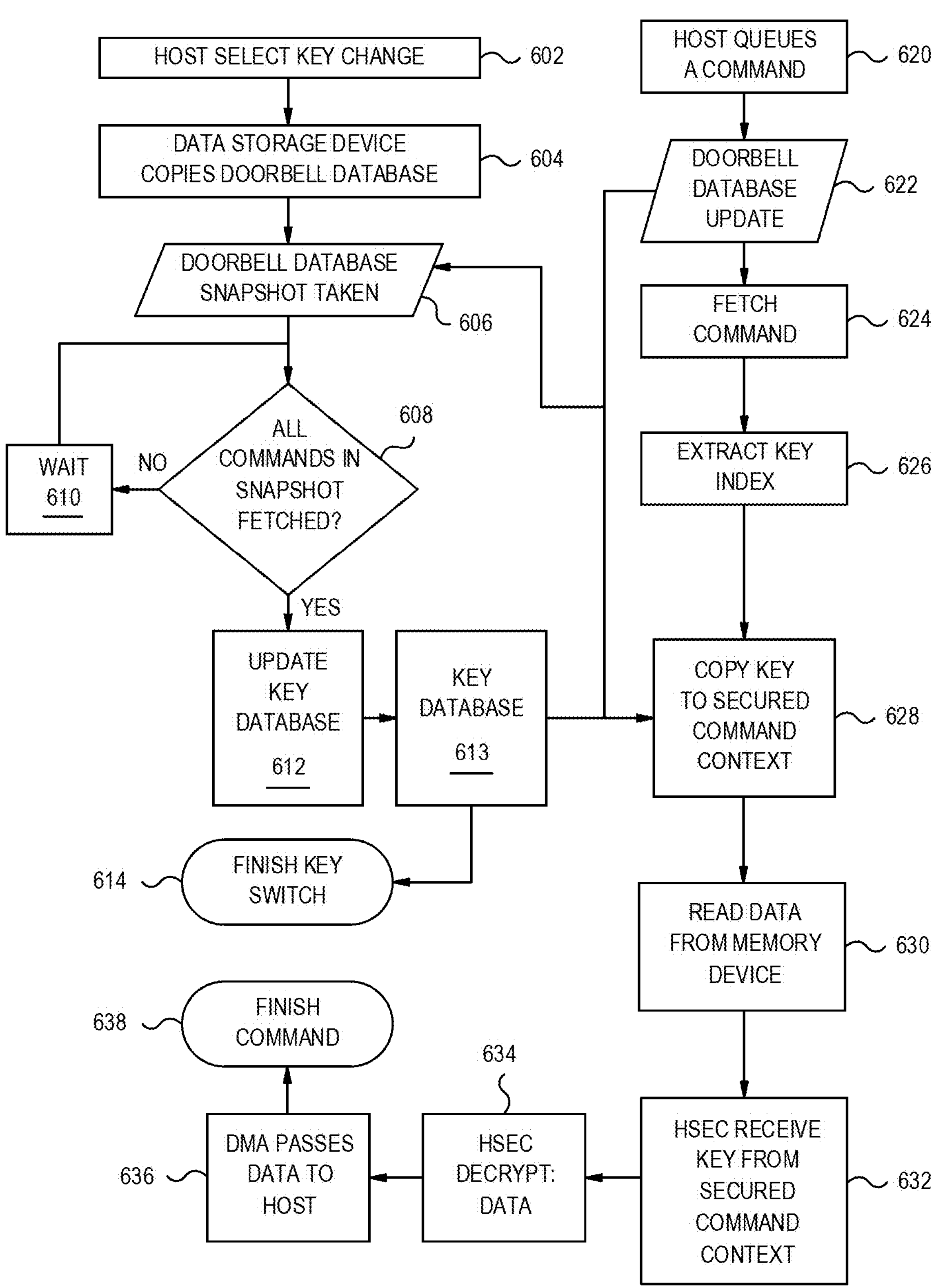
FIG. 6 is a flowchart illustrating a method of key management according to one embodiment.

FIG. 6 is flowchart illustrating a method of key management according to one embodiment. At block 602, the host device instructs the data storage device to change the key. Then, at block 604, the data storage device copies the doorbell database, and a doorbell snapshot is taken at block 606. The data storage device then determines whether all commands in the snapshot have been fetched at block 608. If all of the commands in the doorbell snapshot have not been fetched, then the data storage device waits at block 610. Once all commands in the DB snapshot have been fetched in block 608, the key database is updated in block 612 resulting in an updated/new key database in block 613. Finally, the key switch occurs in block 612. Blocks 604, 606, 608, 610, 612, and 613 are all part of the data storage device administrative key management.

In parallel to the administrative key management, commands are processed. Specifically, the host device queues a command in block 620. The doorbell database is updated in block 622 with the queued command. This updated doorbell database in block 622 is the doorbell database containing all of the commands that have been queued for which the doorbell snapshot is taken in block 606. Thereafter, in block 624, commands that have been queued are fetched. The key index is then extracted in block 626, and the key is copied to the secured-command-context in block 628. The key copied in block 628 is used to update the doorbell snapshot taken in block 606. Additionally, the updated key database from block 613 is what is used for copying the key in block 628. Blocks 622, 624, 626, and 628 are all part of the data storage device control path.

Thereafter, data can be read from the memory device in block 630. The Him Security Engine (HSCE) then receives the key from the secured-command-context in block 632, the HSCE then decrypts the data in block 634, and the DMA passes the requested, now decrypted data, to the host in block 636 to finish command processing in block 638. Blocks 630, 632, 634, and 636 are all part of the data storage device data path.

It is important to note that the host device can continue to queue commands during the key switching. Also, the key change (or deletion) request will remain pending until all queued commands have been fetched (and their key is updated in the secure command context). The key change (or deletion) request is pending until there are no commands being executed that use the pre-changed (or pre-deleted) key. Any new commands queued by the host will not affect the pending status of the key switch command.

Figure 7:
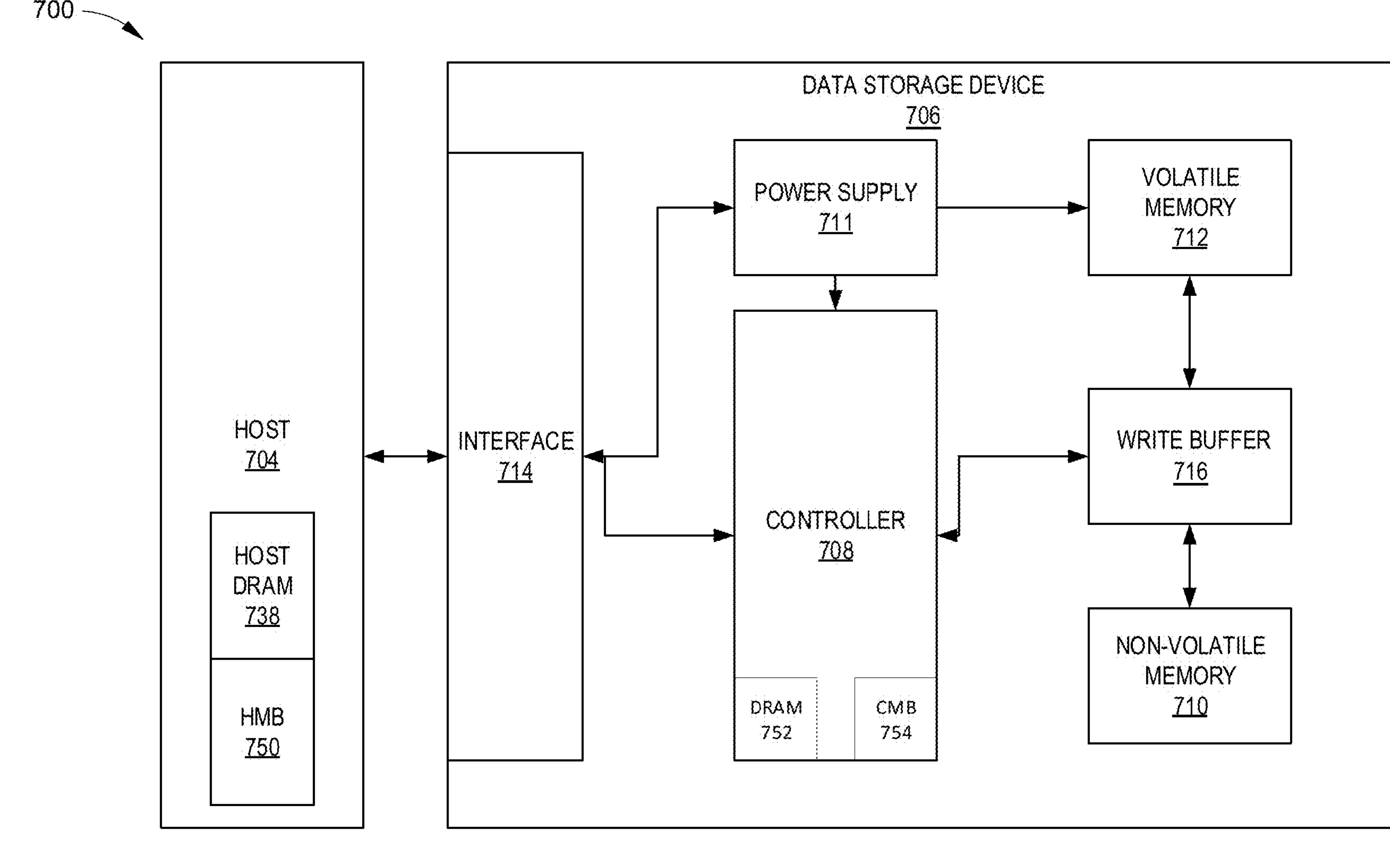
FIG. 7 is a schematic block diagram illustrating a storage system in which a data storage device may function as a storage device for a host device, according to certain embodiments.

FIG. 7 is a schematic block diagram illustrating a storage system 700 in which a host device 704 is in communication with a data storage device 706, according to certain embodiments. For instance, the host device 704 may utilize a non-volatile memory (NVM) 710 included in data storage device 706 to store and retrieve data. The host device 704 comprises a host DRAM 738 and, optionally, a host memory buffer (HMB) 750. In some examples, the storage system 700 may include a plurality of storage devices, such as the data storage device 706, which may operate as a storage array. For instance, the storage system 700 may include a plurality of data storage devices 706 configured as a redundant array of inexpensive/independent disks (RAID) that collectively function as a mass storage device for the host device 704.

The host device 704 may store and/or retrieve data to and/or from one or more storage devices, such as the data storage device 706. As illustrated in FIG. 7, the host device 704 may communicate with the data storage device 106 via an interface 714. The host device 704 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 706 includes a controller 708, NVM 710, a power supply 711, volatile memory 712, the interface 714, and a write buffer 716. In some examples, the data storage device 706 may include additional components not shown in FIG. 7 for the sake of clarity. The controller 708 may include volatile memory such as DRAM 752 as well as a controller memory buffer (CMB) 754 dedicated for host device 704 usage. For example, the data storage device 706 may include a printed circuit board (PCB) to which components of the data storage device 706 are mechanically attached and which includes electrically conductive traces that electrically interconnect components of the data storage device 706 or the like. In some examples, the physical dimensions and connector configurations of the data storage device 706 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 706 may be directly coupled (e.g., directly soldered or plugged into a connector) to a motherboard of the host device 704.

Interface 714 may include one or both of a data bus for exchanging data with the host device 704 and a control bus for exchanging commands with the host device 704. Interface 714 may operate in accordance with any suitable protocol. For example, the interface 714 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 714 (e.g., the data bus, the control bus, or both) is electrically connected to the controller 708, providing an electrical connection between the host device 704 and the controller 708, allowing data to be exchanged between the host device 704 and the controller 708. In some examples, the electrical connection of interface 714 may also permit the data storage device 706 to receive power from the host device 704. For example, as illustrated in FIG. 7, the power supply 711 may receive power from the host device 704 via interface 714.

The NVM 710 may include a plurality of memory devices or memory units. NVM 710 may be configured to store and/or retrieve data. For instance, a memory unit of NVM 710 may receive data and a message from controller 708 that instructs the memory unit to store the data. Similarly, the memory unit may receive a message from controller 708 that instructs the memory unit to retrieve data. In some examples, each of the memory units may be referred to as a die. In some examples, the NVM 710 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 710 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 711 may provide power to one or more components of the data storage device 706. When operating in a standard mode, the power supply 711 may provide power to one or more components using power provided by an external device, such as the host device 704. For instance, the power supply 711 may provide power to the one or more components using power received from the host device 704 via interface 714. In some examples, the power supply 711 may include one or more power storage components configured to provide power to the one or more components when operating in a shutdown mode, such as where power ceases to be received from the external device. In this way, the power supply 711 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 712 may be used by controller 708 to store information. Volatile memory 712 may include one or more volatile memory devices. In some examples, controller 708 may use volatile memory 712 as a cache. For instance, controller 108 may store cached information in volatile memory 712 until the cached information is written to the NVM 710. As illustrated in FIG. 1, volatile memory 712 may consume power received from the power supply 711. Examples of volatile memory 712 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 708 may manage one or more operations of the data storage device 706. For instance, controller 708 may manage the reading of data from and/or the writing of data to the NVM 710. In some embodiments, when the data storage device 706 receives a write command from the host device 704, the controller 708 may initiate a data storage command to store data to the NVM 710 and monitor the progress of the data storage command. Controller 708 may determine at least one operational characteristic of the storage system 700 and store at least one operational characteristic in the NVM 710. In some embodiments, when the data storage device 706 receives a write command from the host device 704, the controller 708 temporarily stores the data associated with the write command in the internal memory or write buffer 716 before sending the data to the NVM 710.

Figure 8:
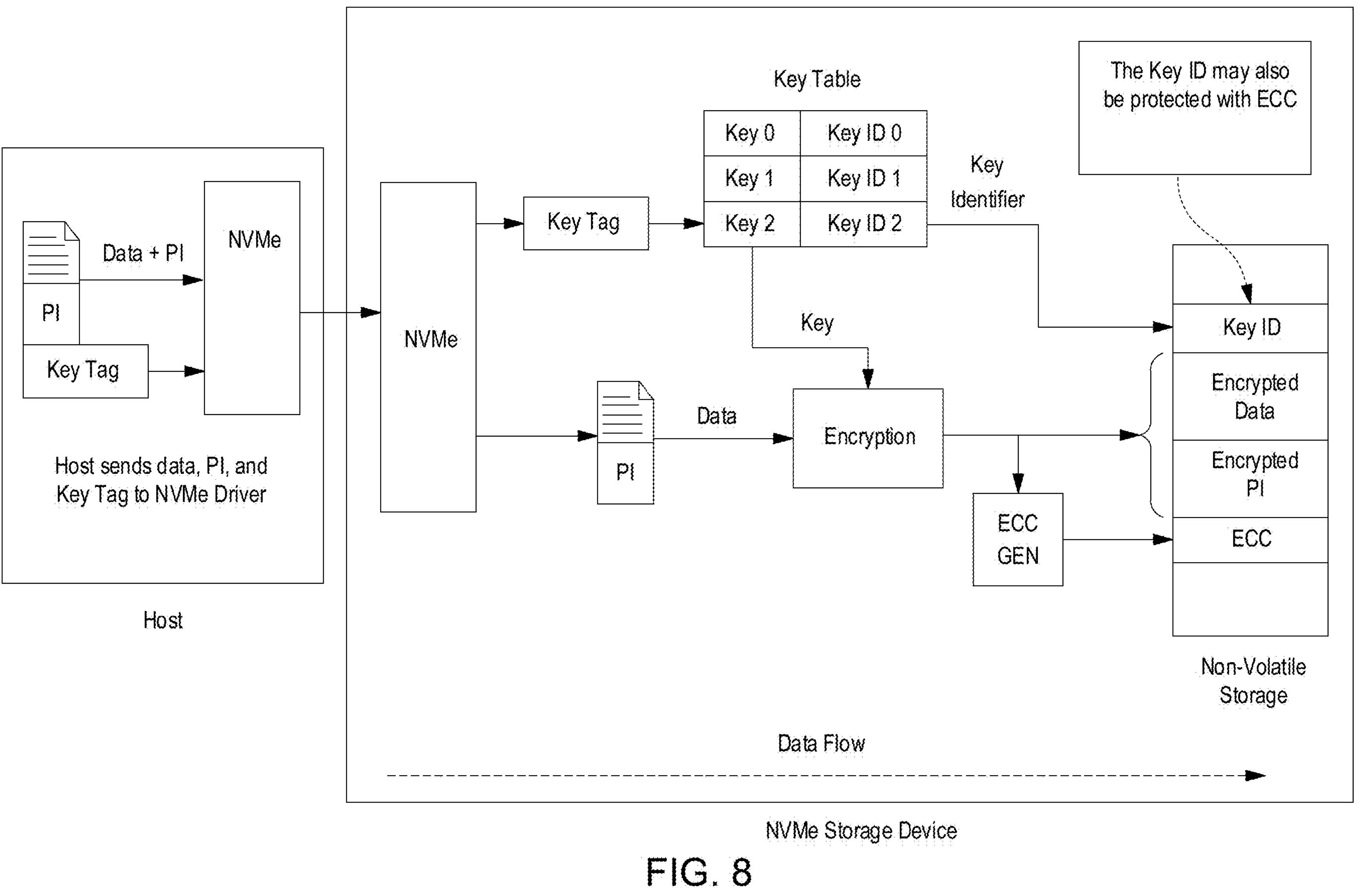
FIG. 8 is a schematic block diagram illustrating a key-per-IO write flow according to one embodiment.

FIG. 8 is a schematic block diagram illustrating a key-per-IO write flow according to one embodiment. In key-per-IO, the host provides the key tag in the IO commands. The data storage device uses the information and accesses the correct offset in the key table to get the keys. Later, in the data transfer flows, the keys are used. In some scenarios, the host device may use security commands to change the keys in the key table.

Security related parameters must be isolated from the entire system. Only root-of-trust module and specific HW engines are allowed to access the databases, which is a basic security requirement. In some flows, some of the security parameters are modified during other IO operations. The changes may be driven by host requests or by internal components. Several examples that require the changes are: the key changes are driven by the host device; detection of security may cause the system to lockdown; change in namespace such as adding or removing a namespace may cause defragmentation in the security tables; changes in the security access permission is driven by the host; and lastly, lockdown requests come from the host device.

Figure 9:
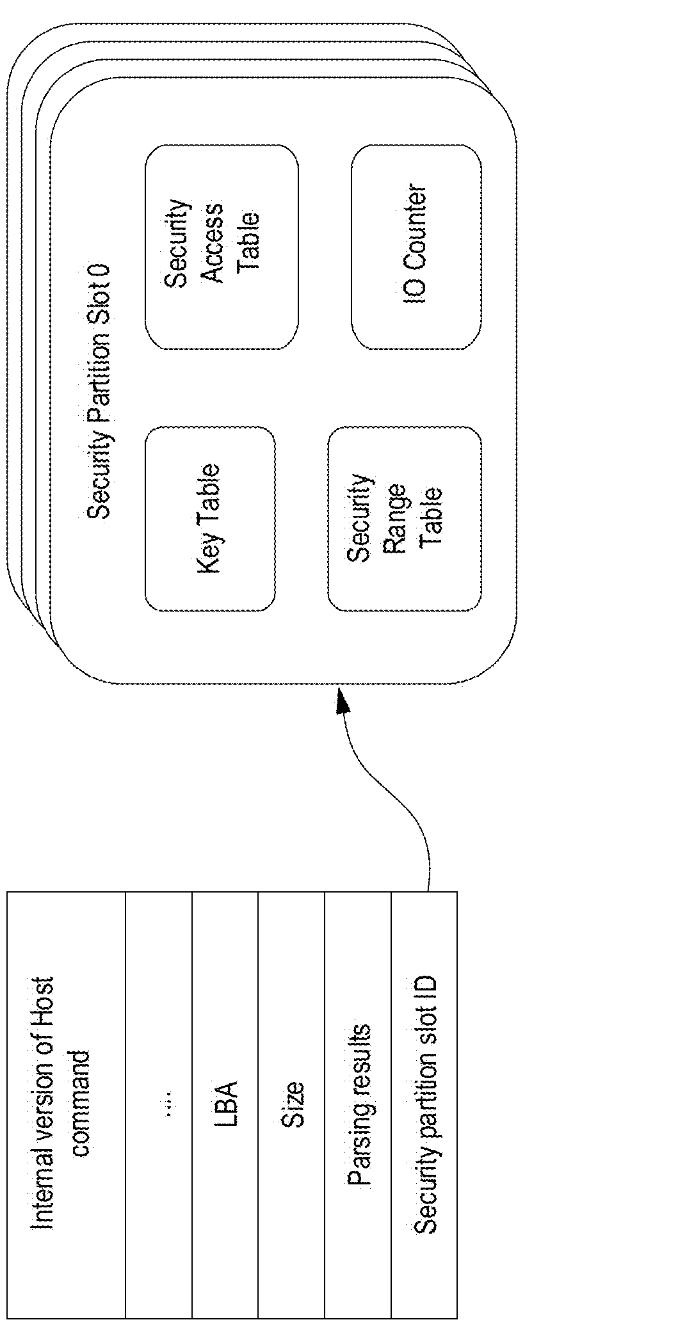
FIG. 9 is a schematic block diagram illustrating multiple security partitions according to one embodiment.

FIG. 9 is a schematic block diagram illustrating multiple security partitions according to one embodiment. The device controller holds multiple security partition slots. FIG. 9 also describes the information held in each slot. The key table holds all supported AES-XTS keys used in the data-transfer. The security range table maps the LBA ranges into indices in the key table. The security access table holds security attributes such as access permission and lockdown per namespaces and PCIe ports. The security partition slot also includes the IO counter that holds the current pending commands in the device attached to this specific security partition slot. Whenever getting a command that needs some security attributes, the currently used security partition slot ID is attached to the command.

Figure 10:
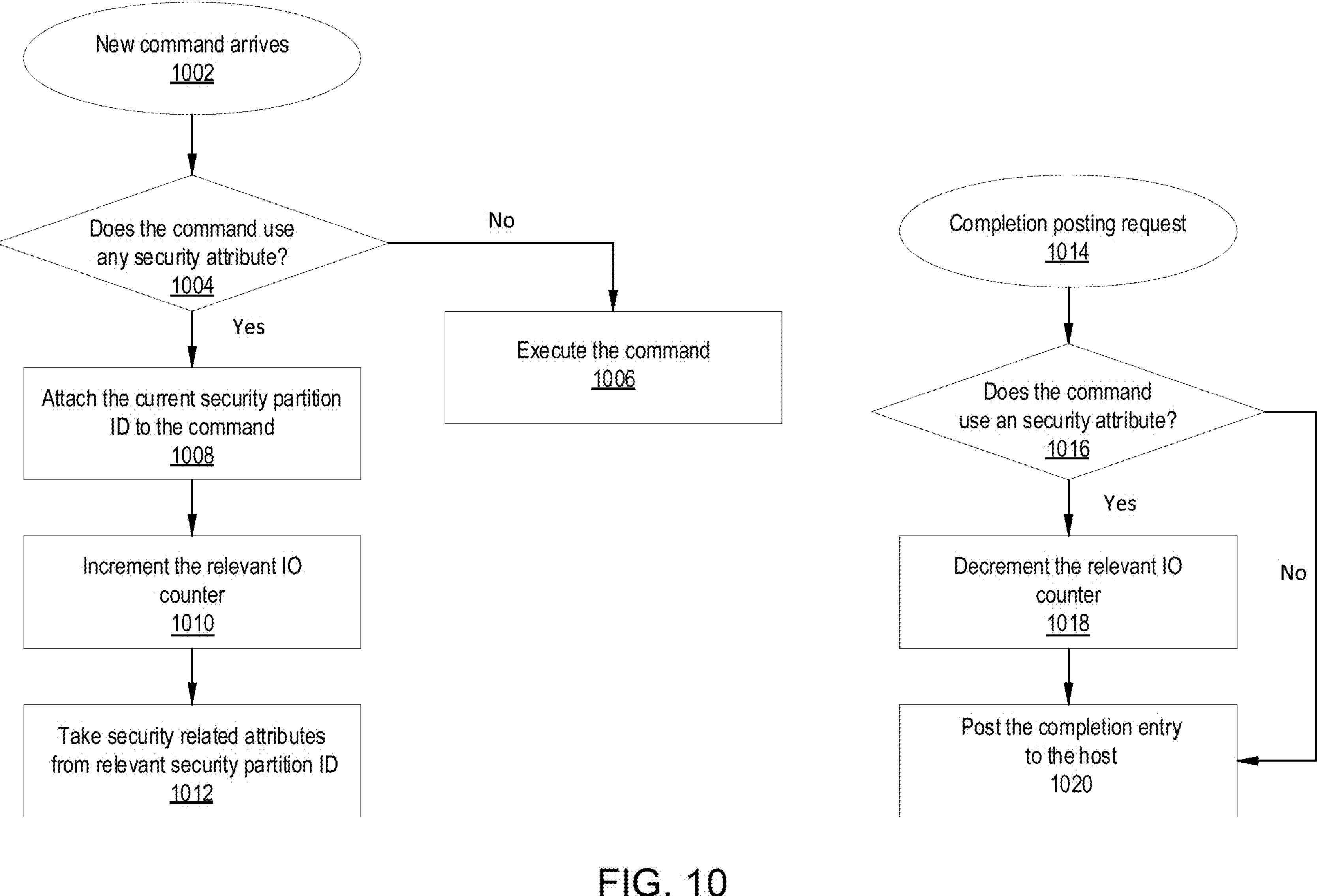
FIG. 10 is a flowchart illustrating a method of command and completion flows according to one embodiment.

FIG. 10 is a flowchart illustrating a method of command and completion flows according to one embodiment. The command execution flows while supporting multiple security partition databases. The first flowchart describes the command arrival path. When the command needs to use security attributes, the security partition ID is attached to the command and the relevant IO counter is incremented. When the command is executed (e.g. data transfer), the security attributes are taken from the slot attached to the command.

In operation 1002, a new command arrives from the host device. In operation 1004, the device controller then determines whether the command from the host device uses any security attributes. The security attributes are held in the security access table. In operation 1006, if the command from the host device does not use any security attributes then the device controller will execute the command.

In operation 1008, if the command from the host device does use any security attributes then the device controller attaches the current security partition ID to the command. In operation 1010, after the security partition ID is attached to the command the device controller then increments the relevant IO security counter. In operation 1012, the device controller takes the security related attributes from the relevant security partition ID.

A completion flowchart is shown in operations 1014-1020. When completing a command, the relevant IO counter may be decremented. In operation 1014, there is a completion posting request. In operation 1016, the device controller determines whether the command uses any security attributes. If the command does not use any security attributes then the process will proceed to operation 1020. In operation 1018, if the command does use any security attributes then the device controller decrements the relevant IO security counter. In operation 1020, the data storage device proceeds to post the completion entry to the host device.

Figure 11:
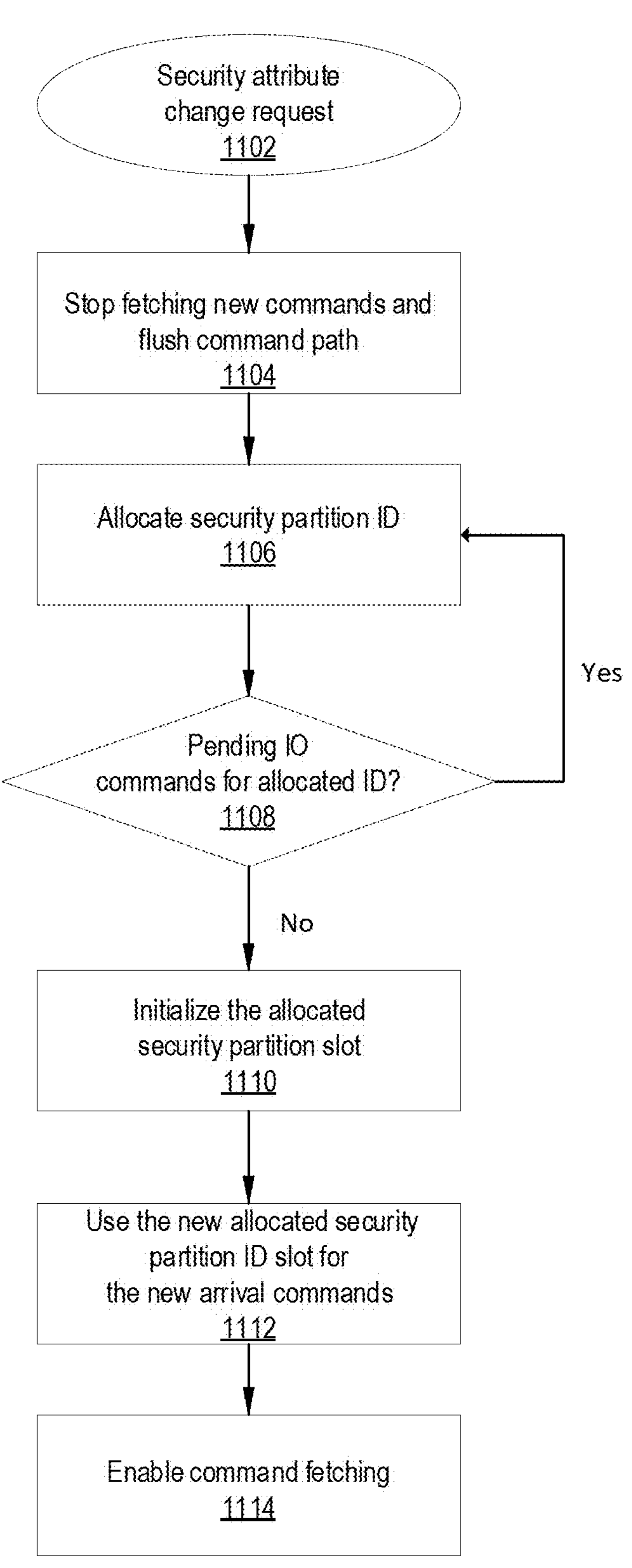
FIG. 11 is a flowchart illustrating a method of security parameter change flow according to one embodiment.

FIG. 11 is a flowchart illustrating a method of security parameter change flow according to one embodiment. The flowchart describes security parameter modifications during IO traffic. Command fetching is stopped, and the command path is flushed. Then, a security partition slot is allocated. If the IO counter of the slot is not zero, the logic either allocates another slot or waits till the IO counter is zero. Non-zero value of the IO counter means that there is at least one pending command that is going to use the security parameters stored in this slot. After a successful allocation, the slot is initialized by root-of-trust module. Whenever getting a new command, the new allocated slot ID will be attached to the commands. Finally, command fetching is enabled going back to normal operations.

In operation 1102, the host device requests a security attribute change. In operation 1104, the system stops fetching new commands and flushes the command path. In operation 1106, the system allocates the security partition ID. In operation 1108, the system determines whether there are any pending IO commands for the allocated ID. If there are pending IO commands for the allocated ID, then the controller circles back to operation 1106. In operation 1110, if there are no pending IO commands for the allocated ID then the system initializes the allocated security partition slot. In operation 1112, the system uses the new allocated security partition ID slot for the new arrival commands. In operation 1114, the system enables command fetching for normal data transfer without stalling.

Figure 12:
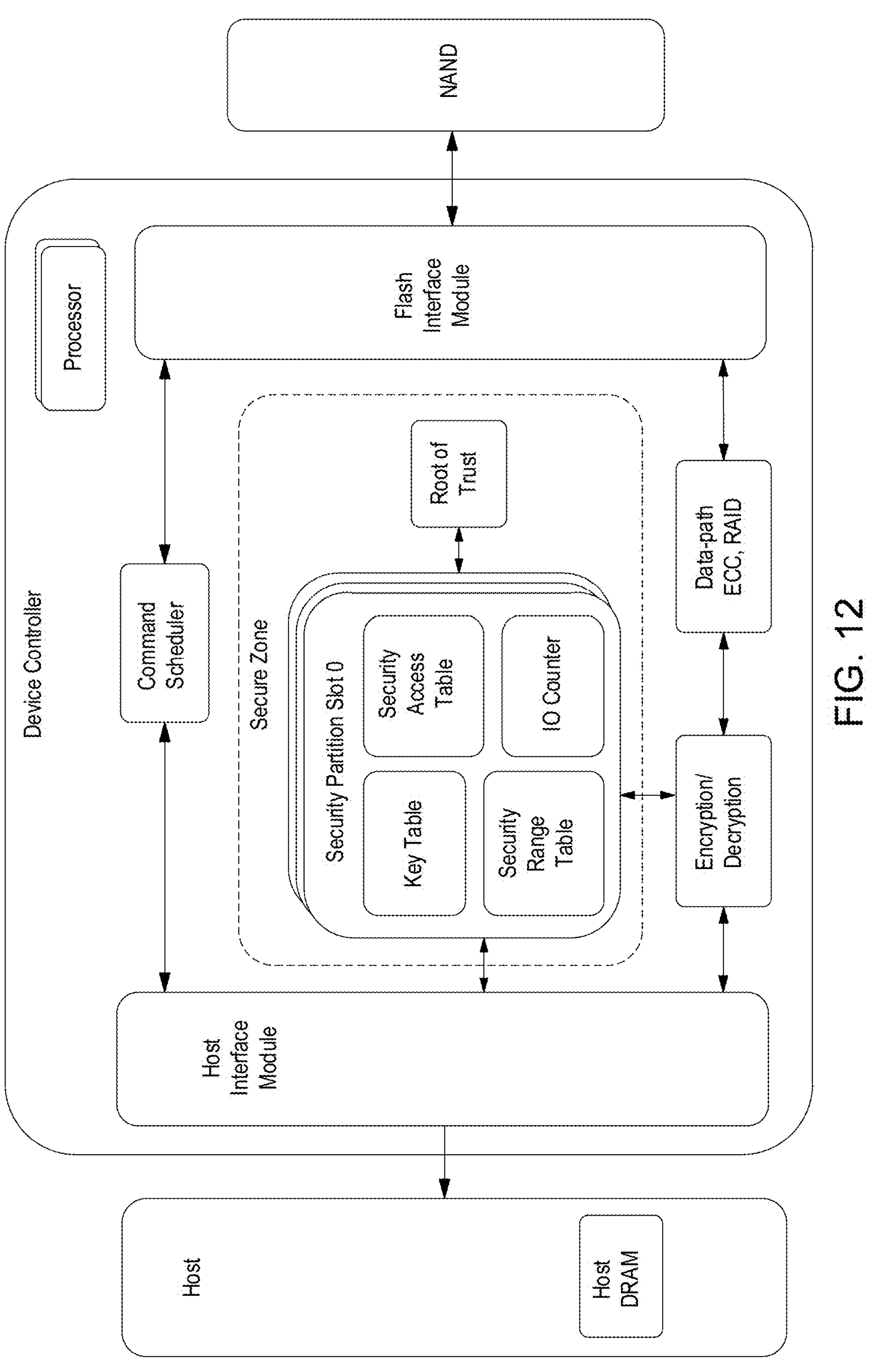
FIG. 12 is a schematic block diagram illustrating a high-level system block diagram according to one embodiment.

FIG. 12 is a schematic block diagram illustrating a high-level system block diagram according to one embodiment. The device controller incorporates two security partition slots. The two partition slots are utilized as a ping-pong buffer allowing modifications in security parameters without stalling the IOs. The security zone is isolated from the rest of the system due to security requirements. Only the root-of-trust module of any few specific (HW) engines can access the internal databases. The internal databases hold security parameters. Multiple security partition slots are incorporated while each slot may hold the following parameters. The security keys used by the AES-XTS engine for user data encryption and decryption. The security keys used to grant access permission and other attributes for read and write operations, which may be per namespace and PCIe port. An index to security key table. The security range table is used to map the host namespace ID and LBA to key index. In key-per-io drive, the table is bypassed since the table is directly provided by the host.

By modifying support security parameters without stalling data transfer, QoS and performance benchmarks in real host device applications that modify security related parameters often is improved. The partitions are simple for implementation and thus contribute to time-to-market as well.

In one embodiment, a data storage device comprises: a memory device; and a controller coupled to the memory device, wherein the controller is configured to: receive a command; determine that the command utilizes security attributes; attach current security partition identification (ID) to the command; increment an input-output (IO) security counter; obtain security related attributes from current security partition; and execute the command. The controller is further configured to: receive a completion posting request; decrement the IO security counter; and post a completion entry. The controller includes at least two security partitions. Each security partition includes a key table; a security access table; a security range table; and an IO counter. The key table is different for each security partition. Commands utilize only one partition. The command, after being received, comprises: a logical block address (LBA); parsing results; and a security partition slot ID. The controller is further configured to receive a security attribute change request. The controller is further configured to: stop fetching new commands; allocate a security partition slot; initialize the allocated security partition slot; use the allocated security partition slot; and enable command fetching. The controller is further configured to flush a command path.

In another embodiment, a data storage device comprises: a memory device; and a controller coupled to the memory device, wherein the controller is configured to: receive a security attribute change request; allocate a security partition slot, wherein the controller comprises at least two partition slots and wherein each partition slot has different security attributes; initialize the allocated security partition slot; and enable command fetching. The controller is further configured to: stop fetching new commands upon receiving the change request; and flush a command path. The controller is further configured to continue data transfer in between stopping fetching new commands and enabling command fetching. Each partition slot has a different security partition ID and wherein the controller is further configured to attach the security partition ID to new commands received. The controller is further configured to increment and decrement an input-output (IO) counter, wherein the increment is in response to receiving a new command and the decrementing is in response to completing execution of a command. The controller is further configured to determine whether there are any pending input-output (IO) commands pending for the allocated security partition, wherein the determining occurs prior to enabling command fetching. The controller is further configured to determine whether an input-output (IO) counter is equal to 0 or greater than 0.

In another embodiment, a data storage device comprises: memory means; and a controller coupled to the memory means, wherein the controller comprises a first security partition slot and a second security partition slot, and the controller is configured to: process first commands with attributes associated with the first security partition slot; receive a security attribute change request; and process second commands with attributes associated with the second security partition slot, wherein at least one first command is executed after receiving the security attribute change request, wherein the at least one first command is executed with the attributes associated with the first security partition slot, and wherein execution of the first commands does not stop upon receipt of the security attribute change request. The controller is configured to delete the first security partition slot upon executing all pending commands for the first security partition slot. The controller is configured to determine whether any new commands utilize any security attributes.

As discussed herein, the device controller incorporates two security partition slots. The two partition slots are utilized as a ping-pong buffer allowing modifications in security parameters without stalling the IOs. The main advantage of this invention could be measured in QoS and performance in benchmarks and real host applications that modify security related parameters often. This disclosure is also simple for implementation which contribute to time-to-market as well.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:

a memory device; and a controller coupled to the memory device, wherein the controller comprises a secure zone that restricts access from the memory device, and the secure zone comprises a plurality of security partitions, and wherein the controller is configured to:

receive a command;

determine that the command utilizes security attributes;

allocate a security partition of the plurality of security partitions for the command, wherein the security partition allocated is based on a determination whether a current security partition of the plurality of security partitions has pending commands, wherein each of the plurality of security partitions is associated with a different security partition ID, and wherein the allocating comprises:

attaching a first security partition ID associated with the current security partition to the command if the current security partition does not have any pending commands; and attaching a different security partition ID associated with a different security partition of the plurality of security partitions to the command if the current security partition has pending commands;

increment an input-output (IO) counter corresponding to a security partition associated with the security partition ID attached to the command, wherein the IO counter represents a number of pending commands utilizing security attributes allocated to a corresponding security partition;

obtain security related attributes from the allocated security partition associated; and execute the command, wherein the controller is further configured to decrement the IO counter corresponding to the security partition associated with the security partition ID attached to the command, wherein incrementing the IO counter is in response to allocating a command utilizing security attributes to the security partition, and wherein decrementing the IO counter is in response to completing execution of a command utilizing security attributes allocated to the security partition.

2. The data storage device of claim 1, wherein the controller is further configured to:

receive a completion posting request;

decrement the IO counter corresponding to the security partition associated with the security partition ID attached to the command; and post a completion entry.

3. The data storage device of claim 1, wherein each security partition of the plurality of security partitions includes:

a key table;

a security access table;

a security range table; and an IO counter.

4. The data storage device of claim 3, wherein the key table is different for each security partition of the plurality of security partitions.

5. The data storage device of claim 1, wherein the command utilizes only one security partition of the plurality of security partitions.

6. The data storage device of claim 1, wherein the command, after being received, comprises:

a logical block address (LBA);

parsing results; and a security partition ID.

7. The data storage device of claim 1, wherein the controller is further configured to receive a security attribute change request.

8. The data storage device of claim 7, wherein the controller is further configured to:

stop fetching new commands;
initialize the allocated security partition;
use the allocated security partition, wherein using the allocated security partition comprises:
receiving one or more new commands after allocating the security partition for the command; and
attaching a same security partition ID to the one or more new commands as the command prior to enabling command fetching; and
enable command fetching.

9. The data storage device of claim 8, wherein the controller is further configured to flush a command path prior to allocating the security partition for the command.

10. A data storage device, comprising:
a memory device; and
a controller coupled to the memory device, wherein the controller comprises a secure zone that restricts access from the memory device, and the secure zone comprises at least two security partition slots, and
wherein the controller is configured to:
receive a security attribute change request;
allocate a security partition slot of the at least two security partition slots based on a determination whether a current security partition slot has pending commands, wherein each security partition slot has different security attributes, and wherein the allocating the security partition slot comprises:
allocating the current security partition slot of the at least two security partition slots to a command if the current security partition slot does not have any pending commands; and
allocating the other security partition slot of the at least two security partition slots to the command if the current security partition slot has pending commands;
increment an input-output (IO) counter corresponding to a security partition slot allocated to the command, wherein the IO counter represents a number of pending commands utilizing security attributes allocated to a corresponding security partition slot;
initialize the allocated security partition slot; and
enable command fetching, wherein the controller is further configured to decrement the IO counter corresponding to the security partition slot allocated to the command, wherein incrementing the IO counter is in response to allocating a command utilizing security attributes to the security partition slot, and wherein decrementing the IO counter is in response to completing execution of a command utilizing security attributes allocated to the security partition slot.

11. The data storage device of claim 10, wherein the controller is further configured to:
stop fetching new commands upon receiving the security attribute change request; and
flush a command path prior to allocating the security partition slot.

12. The data storage device of claim 11, wherein the controller is further configured to continue data transfer in between stopping fetching the new commands and enabling command fetching.

13. The data storage device of claim 10, wherein each security partition slot has a different security partition identification (ID) and wherein the controller is further configured to attach the different security partition ID to any new commands received.

14. The data storage device of claim 10, wherein the controller is further configured to determine whether there are any pending IO commands pending for the allocated security partition slot, wherein the determining occurs prior to enabling command fetching.

15. A data storage device, comprising:
memory means; and
a controller coupled to the memory means, wherein the controller comprises a secure zone that restricts access from the memory means, and the secure zone comprises:
a first security partition slot; and
a second security partition slot, and
wherein the controller is configured to:
determine whether there are commands with security attributes pending for a current security partition slot;
process at least one first command with security attributes associated with the current security partition slot if there are no pending commands with security attributes pending for the current security partition slot;
receive a security attribute change request;
process the at least one first command with security attributes associated with the second security partition slot if there are pending commands with security attributes pending for the current security partition slot; and
decrement an input-output (IO) counter associated with a security partition slot responsive to processing a command with security attributes associated with the security partition slot, wherein the IO counter represents a number of pending commands utilizing security attributes allocated to a corresponding security partition slot, wherein incrementing the IO counter is in response to allocating a command utilizing security attributes to the security partition slot, and wherein decrementing the IO counter is in response to completing execution of a command utilizing security attributes allocated to the security partition slot.

16. The data storage device of claim 15, wherein the controller is configured to delete a security partition slot upon executing all pending commands pending for the security partition slot.

17. The data storage device of claim 15, wherein the controller is configured to determine whether any new commands utilize any security attributes.

* * * * *